United States Patent
Kamenoff

(10) Patent No.: US 7,327,122 B2
(45) Date of Patent: Feb. 5, 2008

(54) BATTERY HEATING CIRCUIT

(75) Inventor: Robert Kamenoff, Port Orange, FL (US)

(73) Assignee: Mathews Associates, Inc., Sanford, FL (US)

( * ) Notice: Subject to any disclaimer, the term of this patent is extended or adjusted under 35 U.S.C. 154(b) by 263 days.

(21) Appl. No.: 10/694,635

(22) Filed: Oct. 27, 2003

(65) Prior Publication Data

US 2005/0017690 A1 Jan. 27, 2005

Related U.S. Application Data

(63) Continuation-in-part of application No. 10/452,738, filed on Jun. 2, 2003, now Pat. No. 6,900,615.

(60) Provisional application No. 60/396,292, filed on Jul. 17, 2002.

(51) Int. Cl.
H02J 7/04 (2006.01)
(52) U.S. Cl. ........................... 320/150; 320/151
(58) Field of Classification Search ................ 320/150, 320/127, 134, 162; 429/7
See application file for complete search history.

(56) References Cited

U.S. PATENT DOCUMENTS

| | | | |
|---|---|---|---|
| 3,300,770 A | 1/1967 | Brousseau et al. | 340/280 |
| 3,432,842 A | 3/1969 | Poznanski | 340/280 |
| 3,440,109 A | 4/1969 | Plattner | 136/161 |
| 3,623,916 A | 11/1971 | Toyooka et al. | 136/161 |
| 3,700,999 A | 10/1972 | Gourse | 320/26 |
| 3,829,709 A | 8/1974 | Maigret et al. | 307/202 |
| 3,885,991 A | 5/1975 | Finkel | 136/107 |
| 4,171,512 A | 10/1979 | Tsuda | 324/133 |
| 4,183,019 A | 1/1980 | Lekhtman | 340/539 |
| 4,394,613 A | 7/1983 | Cole | 320/48 |
| 4,407,909 A | 10/1983 | Goebel | 429/50 |
| 4,423,456 A | 12/1983 | Zaidenweber | 361/77 |
| 4,695,435 A | 9/1987 | Spector | 422/124 |
| 5,119,009 A | 6/1992 | McCaleb et al. | 320/13 |
| 5,126,911 A | 6/1992 | Contiero et al. | 361/84 |
| 5,185,564 A | 2/1993 | Miller | 320/2 |
| 5,349,489 A | 9/1994 | Schelen | 361/77 |
| 5,477,130 A | 12/1995 | Hashimoto et al. | 320/49 |
| 5,508,126 A | 4/1996 | Braun | 429/7 |
| 5,519,557 A | 5/1996 | Kopera, Jr. et al. | 361/84 |
| 5,599,636 A | 2/1997 | Braun | 429/7 |
| 5,623,550 A | 4/1997 | Killion | 381/69.2 |
| 5,652,500 A * | 7/1997 | Kadouchi et al. | 320/150 |
| 5,683,827 A | 11/1997 | Yu | 429/1 |

(Continued)

FOREIGN PATENT DOCUMENTS

JP 56-121270 9/1981

*Primary Examiner*—Bao Q. Vu
*Assistant Examiner*—Alexis Boateng
(74) *Attorney, Agent, or Firm*—Allen, Dyer, Doppelt, Milbrath & Gilchrist, P.A.

(57) ABSTRACT

A battery delivers its rated capacity when the battery is below a temperature when the available battery capacity is limited. The battery includes a heating element, a temperature sensor, and a switch operatively connected to the heating element and temperature sensor and responsive to the temperature sensor for switching on the heating element and raising the temperature of the battery to allow the battery to deliver its rated capacity when a sensed temperature of the battery is below a temperature where available battery capacity is limited.

7 Claims, 6 Drawing Sheets

U.S. PATENT DOCUMENTS

| | | | |
|---|---|---|---|
| 5,710,507 A * | 1/1998 | Rosenbluth et al. | 307/66 |
| 5,795,664 A | 8/1998 | Kelly | 429/7 |
| 5,834,131 A * | 11/1998 | Lutz et al. | 429/7 |
| 5,853,908 A * | 12/1998 | Okutoh | 429/7 |
| 5,916,698 A | 6/1999 | Diederiks et al. | 429/1 |
| 5,936,523 A | 8/1999 | West | 340/545.6 |
| 5,990,661 A | 11/1999 | Ashtiani et al. | 320/128 |
| 6,002,240 A * | 12/1999 | McMahan et al. | 320/150 |
| 6,072,301 A | 6/2000 | Ashtiani et al. | 320/128 |
| 6,078,163 A | 6/2000 | Horie et al. | 320/104 |
| 6,259,229 B1 | 7/2001 | Ashtiani et al. | 320/128 |
| 6,270,916 B1 | 8/2001 | Sink et al. | 429/7 |
| 6,335,611 B1 * | 1/2002 | Sasaki | 320/134 |
| 6,392,388 B1 | 5/2002 | Young | 320/150 |
| 6,429,550 B1 | 8/2002 | Braun et al. | 307/127 |
| 6,441,588 B1 | 8/2002 | Yagi et al. | 320/139 |
| 2001/0004198 A1 * | 6/2001 | Matsuyama | 320/101 |

* cited by examiner

BATTERY HEATING CIRCUIT

RELATED APPLICATION

This is a continuation-in-part patent application based upon prior filed utility application Ser. No. 10/452,738, filed Jun. 2, 2003 now U.S. Pat. No. 6,900,615, which is based on prior filed provisional application Ser. No. 60/396,292 filed Jul. 17, 2002, the disclosures which are hereby incorporated by reference in their entirety.

FIELD OF THE INVENTION

This invention relates to batteries, and more particularly, to batteries with heating and discharge circuits.

BACKGROUND OF THE INVENTION

The copending patent application Ser. No. 10/452,738 ("the '738 application") addresses the problem where federal, state and local agencies require many types of batteries, including primary or rechargeable batteries, for example lithium batteries as one example only, to be discharged completely prior to discarding the battery. Many batteries must be disposed of in a reliable manner because of the inherent risk of fire or explosion created by the improper use or disposal of batteries. As hazardous batteries become more commonplace to power personal and commercial equipment, it is necessary to improve battery discharge systems associated with these types of hazardous batteries and overcome prior art reliability problems in battery discharge, such as caused by moving components, and/or sealing problems. Often, water seeps into a battery casing. If a cell is hazardous, such as lithium, and contacts the water, it could explode. Thus, it is required to fully dissipate any battery charge, such as a lithium battery, before it can be disposed to minimize the chance of explosion or fire.

Typically, prior art batteries have often been discharged using external clip leads and resistors. This method is generally crude and unreliable. It could also create a shock potential. Other battery discharge systems offer some improvement, but still pose problems. For example, U.S. Pat. No. 6,270,916 to Sink et al. discloses a complete discharge device for a lithium battery that is more reliable than an external clip and resistor. It uses internal electromechanical switches and resistors, and "pull tabs" that are accessed via access holes formed in the battery case. This type of battery Complete Discharge Device (CDD) uses a CDD actuator that is or may be prone to self-activation under physical abuse conditions. A switch, formed of a switch contact, such as a spring contact, is biased toward a contact pad. When the contact and contact pad meet, the discharge circuit is activated. Other prior art battery discharge devices use switches that can be actuated by knobs, handles or screws. These actuation devices can typically be accessed from outside the battery by removing a watertight cover or instruction label.

Other patents disclose different types of battery discharge systems, such as U.S. Pat. Nos. 4,407,909; 4,695,435; 5,119,009; and 5,185,564. The '009 patent discloses another manually operated switch that selectively couples the discharge mechanism to at least one lithium cell to complete discharge. The '564 patent discloses a battery discharge apparatus using a strap for mounting a housing to a battery and having adjustable contact members. Similar to other prior art battery discharge mechanisms and systems, these disclosed systems could be unreliable because they often use electromechanical and/or other types of moving or unreliable parts.

There is also a requirement that batteries be watertight. This requirement becomes critical when the battery contains a lithium cell that could explode upon contact with water. To meet this stringent design requirement, a watertight seal is often provided between the battery casing and any actuator used for actuating a battery discharge circuit. In some battery designs, this is accomplished by using a "peel off" label over an access hole, or a nylon seal positioned between an actuator and a battery casing. These seals, however, have often proven unreliable, particularly when the internal pressure in the battery increases because of temperature changes or altitude changes.

The invention set forth in the '738 application overcomes these reliability and sealing problems for these batteries. In the '738 application, a light sensing circuit is used and contains no moving parts, and is connected to a battery discharge circuit such that the battery discharge circuit is actuated after exposing to light the light sensing circuit.

The light sensing circuit is preferably mounted within the battery. The battery can have an opening (preferably watertight) formed in the battery casing through which ambient light enters for exposing the light sensing circuit. A removable, opaque cover is positioned over the opening and blocks light from passing onto the light sensing circuit. Upon removal of the opaque cover, the light sensing circuit is exposed to light. A lense is preferably positioned and sealed in a watertight manner at the opening to prevent water from passing into the battery and engaging a battery, for example, a lithium cell or other similarly hazardous cell. The lense allows light through the opening and onto the light sensing circuit upon removal of the cover. In one aspect of the present invention, the cover comprises a removable label adhesively secured onto the battery. A latching circuit can latch the battery discharge circuit into an "ON" condition to maintain battery discharge even when the light sensing circuit is no longer exposed to light.

There are also different functions associated with battery discharge circuits. One of these functions is a heating circuit. Examples of battery heating circuits include those disclosed in U.S. Pat. Nos. 3,440,109; 3,623,916; 5,508,126; 5,599,636; 5,795,664; 5,834,131; 5,990,661; 6,002,240; 6,072,301; 6,078,163; 6,259,229; 6,392,388; and 6,441,588.

One drawback that may not be adequately addressed by prior art proposals is that associated with the increase in internal battery resistance, which increases significantly at these lower temperatures. In most battery applications, the equipment being powered by the cell or battery has a minimum operating voltage, commonly called the "cut-off voltage." A reduced terminal voltage at lower temperatures causes the powered equipment to reach its cut-off voltage prematurely, while the cell or battery has much remaining stored capacity. This phenomenon becomes dominant at the lower 10° C. or so of the cell or battery specified operating temperature range. In some cases at the minimum, specified operating temperature, it is possible to obtain only 10% or 20% of the total capacity from the cell or battery. It would be advantageous to develop a battery and circuit that would overcome this problem in a reliable and acceptable, but cost effective and simple manner.

There is also a problem with some prior art batteries of intentional or inadvertent attempts to charge primary cells or batteries, but instead causing catastrophic failures of the cell or battery. As a result, many battery customers specify that some type of charge protection be provided within a battery.

Many current charge protection technologies use diodes in series with each string of cells or batteries to prevent charging. While the use of diodes performs an intended function, it has some drawbacks. For example, in many battery applications, the equipment being powered by the cell or battery has a minimum operating voltage, commonly called the "cut-off voltage." Some charge protection diodes typically have a forward drop or loss of about 300 millivolts to 1 volt or more. The diode loss causes the powered equipment to reach its cut-off voltage prematurely, while the cell or battery has much remaining stored capacity. Also, the diode dissipates power that is delivered by the cell or battery, but is not delivered to the load. This phenomenon is aggravated at lower operating temperatures because the internal resistance of the cell or battery increases at lower temperatures and thereby lowers its terminal voltage. It would be advantageous if a battery and circuit could be developed to minimize diode loss and provide charge protection and diode replacement.

In other battery applications, there are two voltage limits that the battery must meet. There is an open circuit voltage that must not be exceeded. If it is exceeded, damage to the load that the battery is powering could occur. There is also a minimum operating or cut-off voltage that must be maintained or the load that the battery is powering may cease to function. Because of internal resistance of the cells in a battery, the cell voltage drops significantly as a load is applied. This problem is aggravated at colder temperatures.

Generally, the voltage requirements can be met by stacking as many series cells as possible without exceeding the open circuit voltage. Many parallel strings of cells are then added as required to meet the cut-off voltage under the battery load and temperature operating requirements. This approach is effective, but normally requires adding more cells than would normally be required. Besides adding weight and cost to the overall application, this approach may not fit some physical space limitations. An alternative approach has been the use of voltage regulation circuitry such as DC-to-DC converters. This approach may also be an improvement over adding parallel strings or cells, but it is costly, complex and tends to be energy inefficient.

It would be advantageous if a battery and circuit could be used for overcoming the above-noted problems.

SUMMARY OF THE INVENTION

The present invention overcomes the problem when a cell or battery has a minimum operating voltage (the "cut-off voltage") and overcomes the problem resulting at lower temperatures where the powered equipment reaches its cut-off voltage prematurely while the cell or battery has remaining stored capacity. The present invention provides a simple circuit design using a temperature sensor and heating built into the battery. The temperature sensor detects when the cell or battery temperature is below the temperature where available capacity is limited, such as 10° C. above the minimum specified operating temperature of a cell as one non-limiting example. The sensor turns on an internal battery heating element that raises the temperature sufficiently such that the battery can deliver most of its rated capacity. A discharge current circuit could lock out the heater when a battery is not in use to prevent the heater from discharging the battery when stored at cold temperatures.

It is possible that the battery could be required to delivery high energy, short duration discharge pulses. A discharge or load current sensor could turn off the heater when the discharge current is high and ensure that all the available energy from the battery will be delivered to the low periods of peak demand.

In accordance with the present invention, a self-heating battery for delivering its rated capacity is disclosed and is operative when the battery is below a temperature when the available battery capacity is limited. The self-heating battery includes a battery that could be formed as one or more battery cells. A heating element is operatively connected to the battery and powered therefrom for heating the battery. A temperature sensor determines the temperature of the battery. A switch is operatively connected to the heating element and temperature sensor and responsive to the temperature sensor for switching on the heating element and raising the temperature of the battery to allow the battery to deliver its rated capacity when the sensed temperature of the battery is below a temperature where available battery capacity is limited.

The switch could include a transistor switch or a field effect transistor. A comparator could have an output connected to the switch and inputs connected to the temperature sensor for comparing a temperature differential and turning the switch on and off and controlling operation of the heating element. A load current sensing circuit is connected to the heating element and controls operation of the heating element and prevents the battery from discharging when the battery is stored at cold temperatures. The load current sensing circuit includes a switch operatively connected to the heating element and responsive to load conditions. The load current sensing circuit could include a load sensing device and a comparator having inputs operatively connected to the load sensing device. An output is operatively connected to the switch for controlling operation of the switch and heating element based on sensed load conditions.

A battery discharge circuit could be connected to the battery for discharging the battery. This battery discharge circuit could be formed as a light sensing circuit operatively connected to the battery discharge circuit that actuates the battery discharge circuit after exposing the light to the light sensing circuit.

In yet another aspect of the present invention, a charge protection circuit could be operatively connected to the battery for limiting damage to the battery during charging. A flying cell circuit could also be operatively connected to the battery for meeting open circuit and cut-off voltage requirements.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
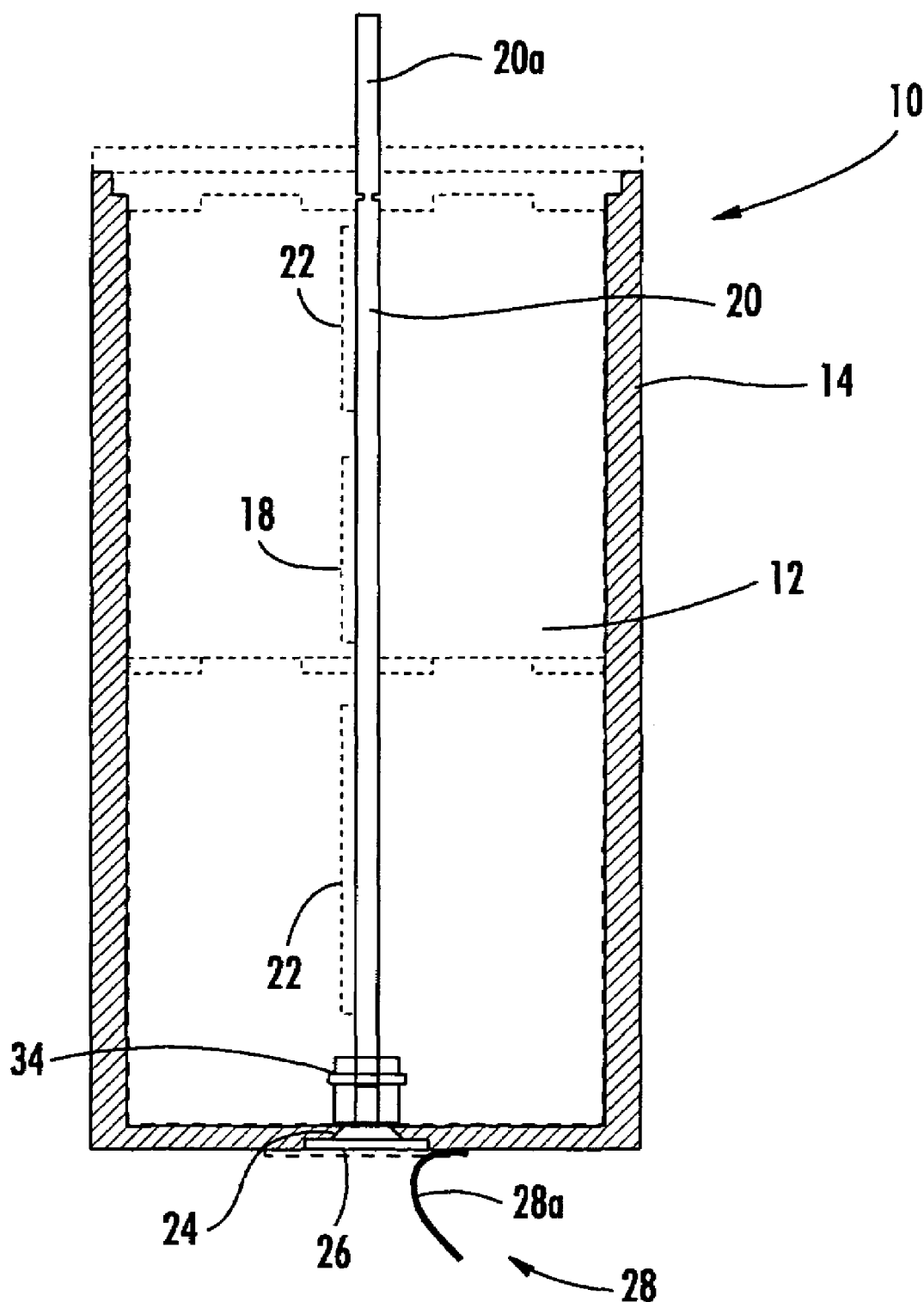
FIG. 1 is a fragmentary, sectional view of a battery and showing basic components for discharging the battery in accordance with the present invention, including a photocell as a light sensing circuit, an opaque pull tab, a transparent lense within a "window" opening of the battery casing, a circuit card that mounts components and includes a break-off tab, and the battery cells, such as lithium cells.
Figure 2:
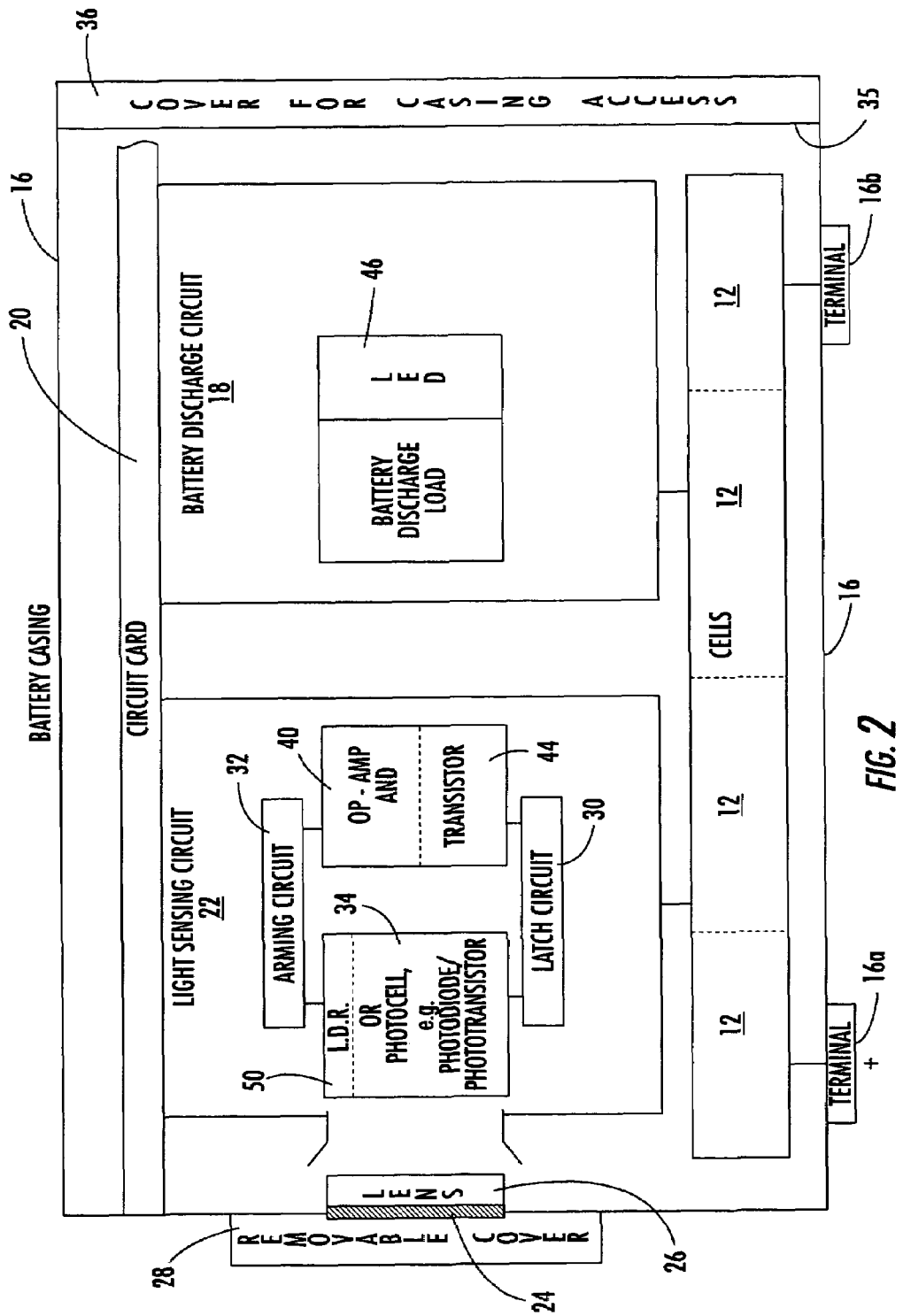
FIG. 2 is a high level block diagram showing basic components used in the apparatus for discharging a battery in accordance with the present invention.
Figure 3:
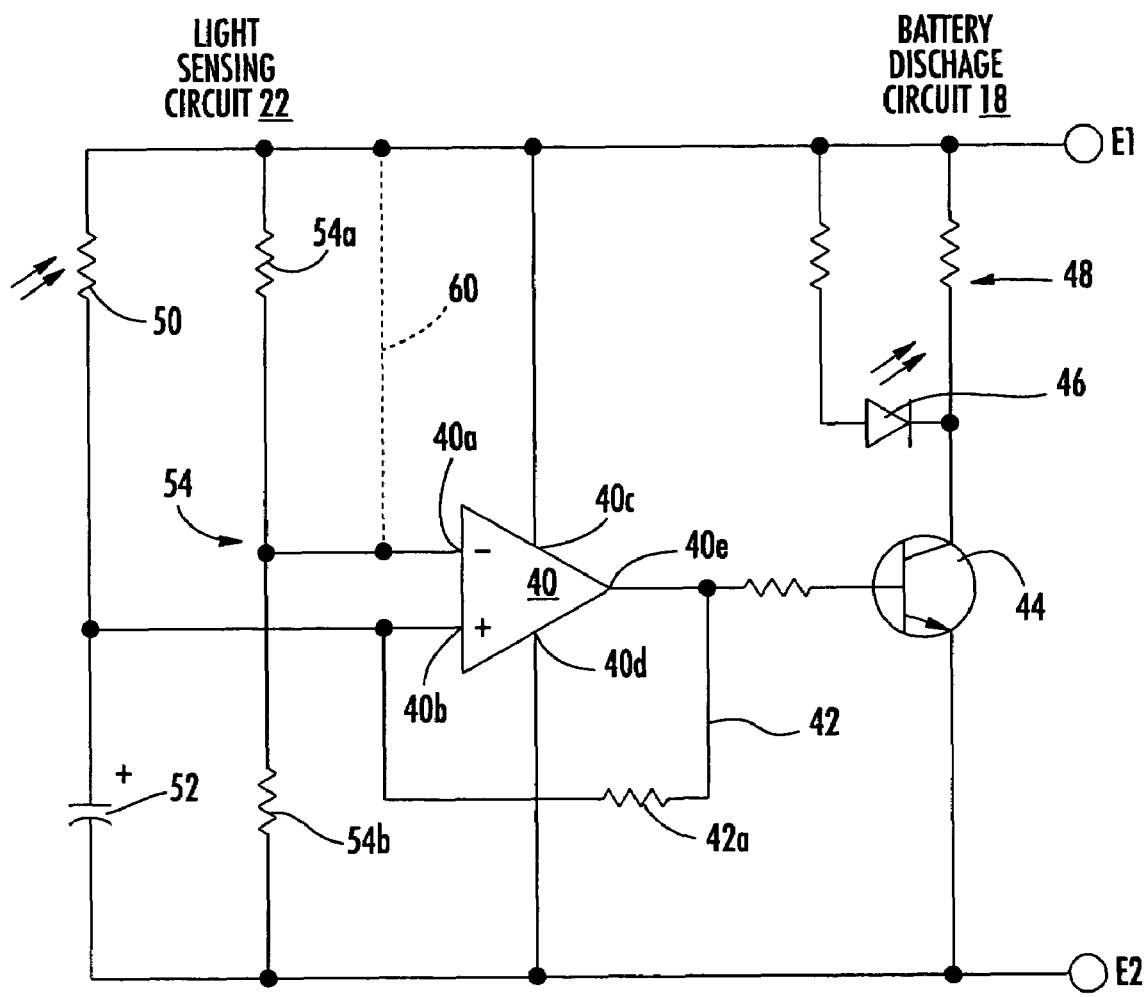
FIG. 3 is a schematic circuit diagram of the battery discharge circuit and light sensing circuit that can be used in the present invention.
Figure 4:
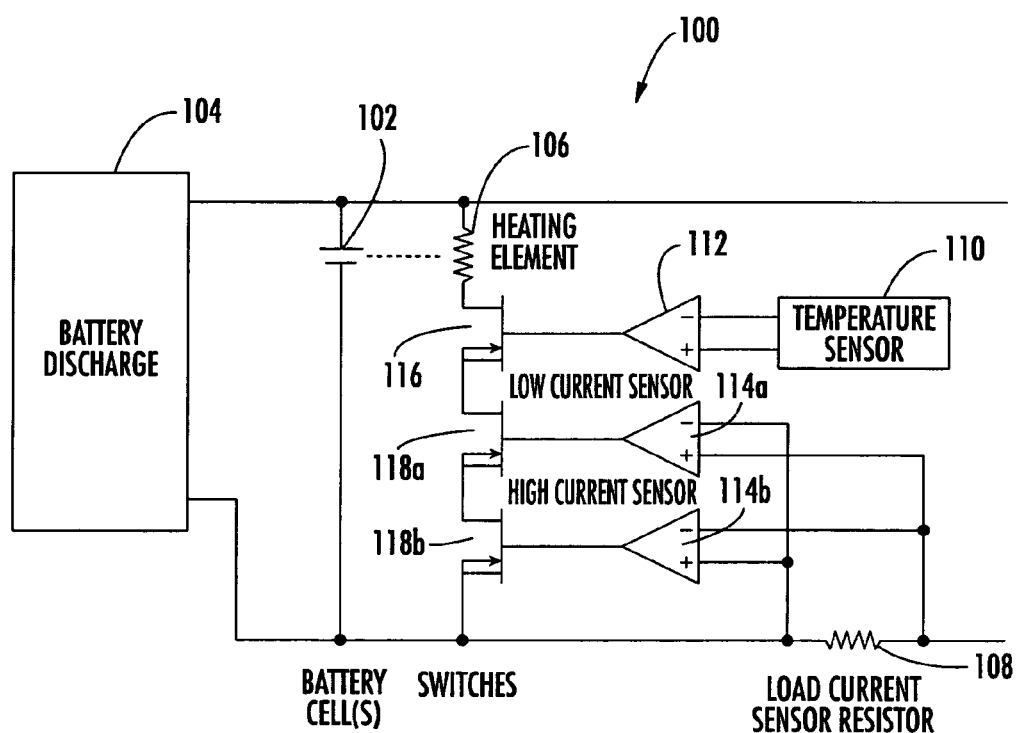
FIG. 4 is a schematic circuit diagram of one example of a battery heater circuit of the present invention.
Figure 5:
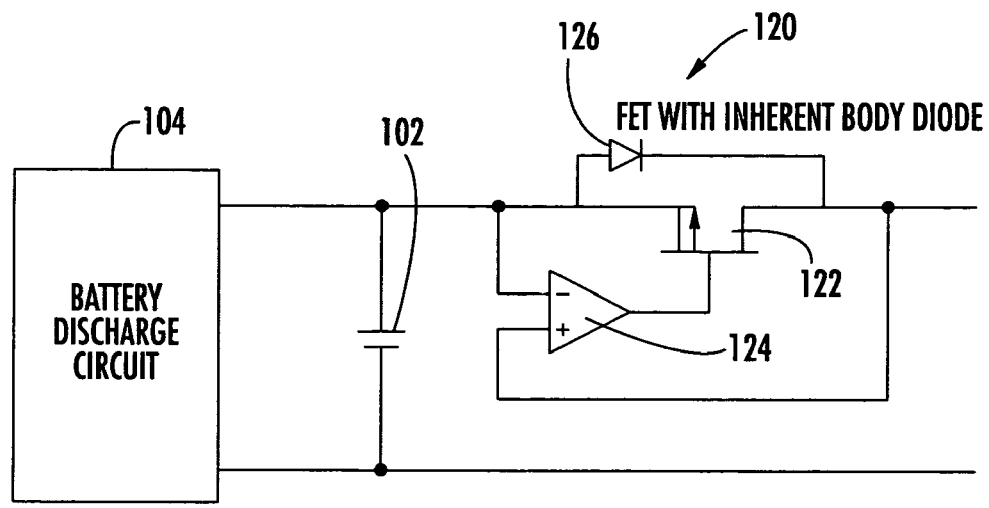
FIGS. 5 and 6 are two different schematic circuit diagrams of examples of a charge protection circuit using a field effect transistor used with the present invention.
Figure 6:
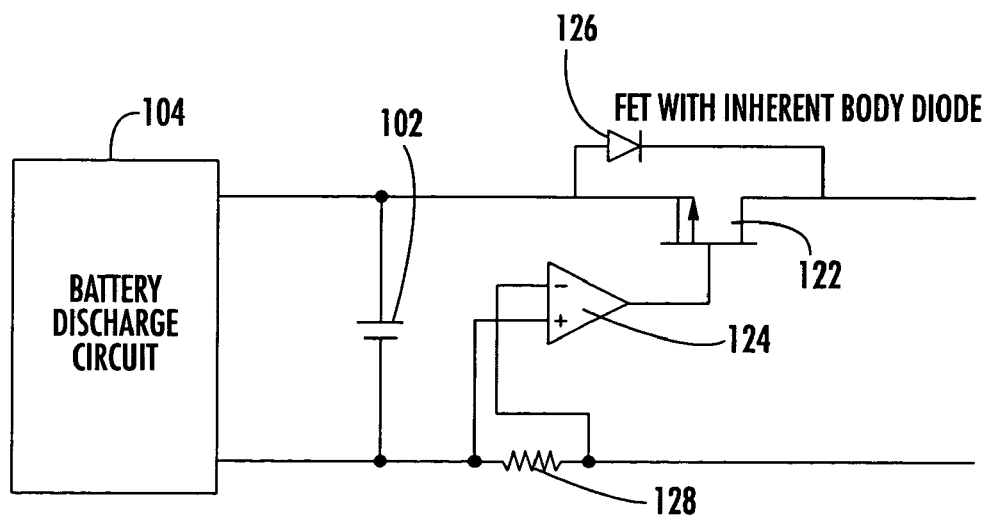
Figure 7:
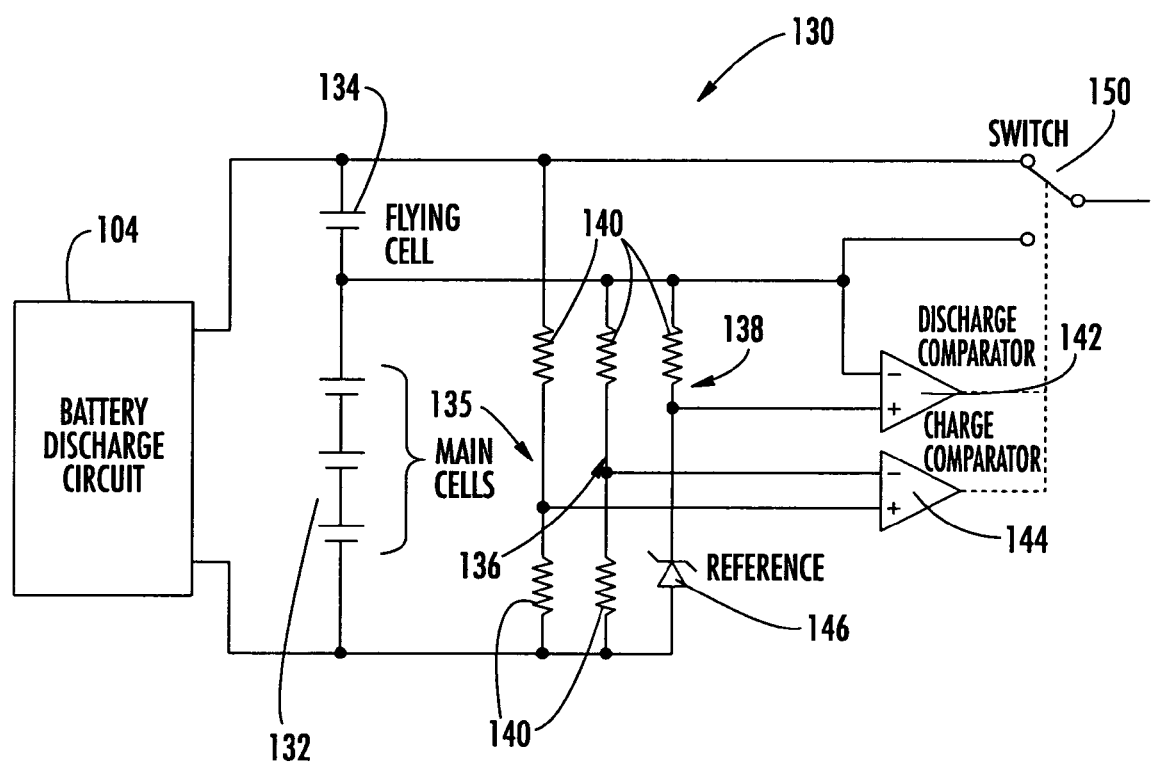
FIG. 7 is a schematic circuit diagram of a flying cell circuit using an extra series, tier of cells that are switched into service when the battery voltage falls to near the minimum cut-off voltage, and are switched out of service when the battery voltage rises to near the open circuit voltage.

For purposes of description and background, the battery discharge circuit disclosed in the '738 application will be set forth relative to FIGS. 1-3. After describing in detail a battery discharge circuit relative to FIGS. 1-3, a description of other circuits that could operate alone or in conjunction with the battery discharge circuit will be set forth in detail. An example of a battery heater circuit of the present invention is shown in FIG. 4. Two examples of a charge protection circuit using a field effect transistor are shown in FIGS. 5 and 6. An example of a flying cell circuit that could be used with the present invention is shown in FIG. 7.

As shown in FIGS. 1 and 2, an apparatus for discharging a battery is shown, and includes a battery (a primary or rechargeable), for example, a lithium battery as a non-limiting example, having a number of battery cells 12 contained within a battery casing 16. The battery casing 16 includes positive and negative terminals 16a, 16b, which interconnect the battery cells 12. A battery discharge circuit 18 is contained within the battery casing 16, such that when actuated, discharges the battery, and more particularly, the battery cells 12.

The battery discharge circuit 18 is formed on a circuit card 20 that is positioned in a medial portion of the battery casing 16, as a non-limiting example. A light sensing circuit 22 is operatively connected to the battery discharge circuit 18 and actuates the battery discharge circuit 18 after exposing to light the light sensing circuit. This circuit 22 also can be formed on the circuit card 20. The battery casing 16 preferably includes an opening 24 that forms a "window" for exposing the light sensing circuit 22 to light. This opening 24 preferably includes a lense 26, such as a transparent or substantially translucent lense, which can be formed from glass, plastic or other material known to those skilled in the art.

The lense 26 is positioned within the opening 24 and sealed to form a watertight barrier to moisture and water. A removable and opaque cover 28 is positioned over the opening 24 and lense 26 to block light from passing onto the light sensing circuit until the cover is removed. In one aspect of the present invention, the opaque cover 28 could be a label or opaque, pull tab 28a (FIG. 1) that is adhesively secured to the battery casing and over the lense. Once the cover or tab 28, 28a is pulled from the casing, ambient light passes through the lense 26, through the opening 24, and onto the light sensing circuit 22 to actuate the battery discharge circuit 18.

As noted before, the lense 26 is preferably mounted in the opening 24 in a watertight seal to prevent water from seeping into the battery casing 16 and creating a fire hazard or explosion by contacting any lithium or other hazardous cells that have not been completely discharged. It should be understood that the watertight seal is provided by the lense 26 with the battery casing 16 and not by any pull tab, label or other cover 28 that is positioned over the opening.

Preferably the light sensing circuit 22 includes a latch circuit 30 that latches the battery discharge circuit 18 into an ON condition to maintain battery discharge even when the light sensing circuit is no longer exposed to light. A non-latching circuit could be used, but the light sensing circuit would require continual exposure of light to fully discharge the battery. Thus, with the latching circuit, the battery can be placed in a position such that light initially exposes the light sensing circuit 22. The light source can be removed while the battery maintains its discharge process.

An arming circuit 32 can be provided that arms the light sensing circuit 22 for operation after battery assembly. Thus, during the initial manufacturing process, the light sensing circuit 22 and battery discharge circuit 18 are disarmed and not operable. Any exposure of the light sensing circuit 22 to light will not activate the battery discharge circuit 18. At final assembly, however, the light sensing circuit, such as a light sensor, for example, a photocell 34 (FIG. 1), can be installed in the battery casing through a casing opening 35 and the opaque label placed over the lense 26 positioned in the opening 24 or "window." When the circuit is armed, a casing cover or lid 36 can be attached and sealed to the battery casing. This arming circuit could be formed as a simple switch, a removable jumper connection, or printed circuit card, break-off tab 20a (FIG. 1), which once broken off, would allow the casing cover 36 to be placed thereon.

FIG. 3 shows an example of one type of circuit, as a non-limiting example, which could be used for the battery discharge apparatus. As illustrated, an operational amplifier 40 as a differentiator or similar circuit is operatively connected to the battery cell(s) with appropriate terminals labeled E1 and E2 having a potential difference therebetween for positive and negative values. The operational amplifier 40 includes the inverting input terminal 40a and the non-inverting input terminal 40b, appropriate voltage supply terminals 40c, 40d and an output terminal 40e. As illustrated, the operational amplifier 40 has a positive feedback loop circuit 42 and loopback resistor 42a that increases output and allows the operational amplifier to drive harder to saturation. The operational amplifier 40 switches state to turn on a transistor 44 acting as a switch, such as the illustrated NPN transistor, which connects to a light emitting diode 46 and resistor circuit having a resistor network 48 also forming a battery discharge load to allow discharge of the battery or battery cell. The light emitting diode 46 also emits light and acts as a visual indication of activation and could be used for battery discharge.

The light sensing circuit 22 includes a light dependent resistor 50 (as a non-limiting example) that can be formed such as by cadmium sulfide or other resistor material. The light dependent resistor 50 has a resistance value that decreases when exposed to light. The light dependent resistor 50 is operatively connected in series to a capacitor 52. Both the resistor 50 and capacitor are parallel with a voltage divider circuit 54 having two resistors 54a, 56b to provide a voltage divided input to the inverting input terminal 40a. The capacitor 52 could be designed with circuit components to provide some low pass or other filtering function. It also provides momentary disarm (when initially connecting to the battery). When transistor 44 is switched ON, in conjunction with the switched state of the operational amplifier, the discharge of cells remains even though the resistor 50 is no longer exposed to light. The light dependent resistor 50 and capacitor 52 also form a divider circuit that provides the input to the non-inverting input terminal 50b, which as noted before, receives the positive feedback from the output terminal 40c.

In this particular example, the arming circuit 32 is illustrated as a jumper line 60 and provides a current flow direct to the inverting input terminal 40a such that even when the operational amplifier 40, transistor 44, and overall battery discharge circuit 18 are connected to the battery cells, if the light dependent resistor 50 is exposed to light, and the resistance of the light dependent resistor drops, the jumper line 60 as illustrated provides a "short" to the inverting input terminal 40a such that the operational amplifier would not saturate and switch operating states. Thus, the operational amplifier would not bias the transistor ON to actuate the battery discharge circuit and operate the light emitting diode and thus allow discharge of the battery. This jumper line 60 could be formed as part of the circuit card 20 on the tab 20a, as shown in FIG. 1, such that before the battery casing cover 36 is placed on the battery casing, the breakable tab 20a formed on the circuit card 20 is broken to break the circuit line connection, as illustrated, and arm the circuit.

FIGS. 4-7 indicate other circuits that can be used in combination with the battery discharge circuit as described relative to FIGS. 1-3. It should be understood that the battery discharge circuit as described can be one type of battery discharge circuit and other discharge circuits can be used as suggested by those skilled in the art. It should also be understood that the circuits described relative to FIGS. 4-7 could operate within a battery alone or in combination with a battery discharge circuit. An example of a battery heater circuit of the present invention is shown in FIG. 4. Two examples of a charge protection circuit using a field effect transistor are shown in FIGS. 5 and 6. An example of a flying cell circuit of the present invention is shown in FIG. 7. The reference numerals begin in the 100 series for the description relative to FIGS. 4-7.

FIG. 4 is a schematic circuit diagram of one example of a battery heating circuit 100 that can be used in the present invention and shows a battery formed by one or more battery cells 102 operatively connected to a battery discharge apparatus or circuit 104, such as the battery discharge circuit described relative to FIGS. 1-3. It should be understood that other battery discharge circuits other than that described relative to FIGS. 1-3 could be used in the present invention. The battery heating circuit 100 overcomes the problem where a cell or battery has a minimum operating voltage for the "cut-off voltage" and, at lower temperatures, any powered equipment reaches its cut-off voltage prematurely while the cell or battery has remaining stored capacity.

The battery heating circuit 100 can typically be included within a battery casing together with the battery discharge circuit 104 and any battery cells and includes a heating element 106, a load current sensor 108, and a temperature sensor 110 connected to a first operational amplifier operable as a comparator (op amp) 112. The load current sensor 108 is connected to a second comparator circuit formed as a low current sensor op amp 114a and high current op amp 114b. Each op amp 114a, 114b has its output connected to a respective switch 118a, 118b, each formed as a field effect transistor in this illustrated embodiment. Although two op amps 114a, 114b are illustrated, it should be understood that one or more than two op amps could be used in parallel with the first op amp 112.

The temperature sensor 112 senses temperature when the cell or battery temperature is below the temperature where available capacity is limited, such as 10° C. above the minimum specified operating temperature of the cell. The temperature sensor 110 is operative with the first op amp 112 to turn on the internal battery heater by providing power to the heating element 106 that is also operatively connected to battery cells 102 for power. This raises the temperature sufficiently such that the battery can deliver most of its rated capacity.

The load current sensor 108 is typically formed as a resistor, but other devices could be used. The sensor 108 is operative with the circuit to lock out the heating element 106 via the op amps 114a, 114b when the battery cell is not in use to prevent the heating element from discharging the battery when stored at cold temperatures. Op amps 114a, 114b are operable with the serially connected switches 116, 118a, 118b to lock out the heating element. As illustrated, op amps 112, 114a, 114b are connected to respective switches 116, 118a, 118b, each formed in this non-limiting example as a field effect transistor and operative as switches and connected to the output of the op amps 112, 114a, 114b.

The temperature sensor 110 is connected to both the inverting and non-inverting inputs of the op amp 112. When the temperature is below the temperature where available capacity is limited, the output of the op amp 112 causes the switch 116 to turn on the heating element 106. When the switch 116 is a field effect transistor (FET), it switches "ON" to provide power to the heating element.

The low current sensor and high current sensor op amps 114, 118a, 118b have their inverting and non-inverting inputs connected on either side of the load current sensor 108 formed in this example as a resistor to determine the voltage drop across the resistor. The outputs from at least one of the op amps 118a, 118b turns on a switch 118a, 118b, which in turn, would allow the heating element 102 to be switched "OFF" or "ON" as desired in conjunction with temperature sensor 110 and switch 116.

In another aspect of the invention, the battery could be required to deliver high energy, short duration discharge pulses. A load current sensor or other sensor could be operative to turn off the heating element when the discharge current is high. It could also ensure that available energy from the battery will be delivered to the load during periods of peak demand. The temperature sensor could be many different types of temperature sensors chosen by one skilled in the art.

Also, the battery discharge circuit 100 could include various sensors for locking out the heating element when the battery is not in use and turning off the heating element when a discharge current is high. The circuit of FIG. 4 could be modified for different types of battery cells and circuits.

FIGS. 5 and 6 illustrate a charge protection circuit 120 that uses a field effect transistor (FET) 122 and an operational amplifier 124 to sense current through the FET by measuring a voltage drop. In an acquiescent state, the op amp 124 senses no voltage across the FET (no current through it) and biases the FET off. The FET in both FIGS. 5 and 6 has an inherent body diode 126, as illustrated. Two different circuits as non-limiting examples are shown in FIGS. 5 and 6. Common elements in both circuit examples for FIGS. 5 and 6 use common reference numerals. Both FIGS. 5 and 6 show the battery discharge circuit 104 and battery cell(s) 102 in parallel with the battery discharge circuit 120. These circuits would typically be all contained within a battery casing. The operational amplifier 124 in both FIGS. 5 and 6 has an output connected to the input of the field effect transistor 122, which operates as a switch. In both examples of FIGS. 5 and 6, an inherent body diode 126 is connected to and in parallel to the source and drain of the field effect transistor 122, as illustrated.

In FIG. 5, the non-inverting input of the op amp 124 is connected to the field effect transistor 122 at its output in a feedback loop configuration. The inverting input is operatively connected to the at least one battery cell 102 and field effect transistor 122, as illustrated.

In FIG. 6, the non-inverting and the inverting inputs of the op amp 124 are connected to a resistor 128 connected to battery cell 102. The resistor is operative as a load sensor, thus allowing the op amp 124 to measure the voltage drop developed across the resistor, which is connected to the battery cell(s) 102 (and discharge circuit 104) as illustrated. The circuits of FIGS. 5 and 6 also allow charge protection diode replacement.

FIG. 7 is a schematic circuit diagram of a flying cell battery circuit 130 that overcomes the problem where typical battery applications include two voltage limits that a battery must meet, as described above. In this type of arrangement, there is an open circuit voltage that must not be exceeded, or damage to a load could occur. There is also a minimum operating or cut-off voltage that must be maintained, or the load may not function. Because of internal resistance of the cells in a battery, the cell voltage drops significantly as a load is applied. This is aggravated at colder temperatures.

In some prior art proposals, the voltage requirements have been met by stacking as many series cells as possible without exceeding the open circuit voltage and adding as many parallel strings of cells as required to meet the cut-off voltage under the battery load and temperature operating requirements. This approach is effective and normally requires adding more cells than would normally be required. Besides adding weight and cost, this approach will not fit some physical space limitations.

An alternative approach has been the use of voltage regulation circuitry such as DC-to-DC converters. This approach is an improvement over adding parallel strings of cells, but it is costly, complex, and tends to be energy inefficient.

The flying cell circuit 130 of the present invention shown in FIG. 7 overcomes these shortcomings. It uses an extra tier of cells that is switched in when the battery voltage falls to near the minimum cut-off voltage and is switched out when the battery voltage rises near the open circuit voltage. As a result, the open circuit and cut-off voltage requirements may be met over a wide range of load currents and operating temperatures with a minimum number of cells, minimum complexity, and maximum energy efficiency.

For rechargeable batteries, additional circuitry can be used to ensure proper charging. The voltage of the flying cell is sensed and compared to the individual voltages of the standard or main cells. When the voltage of the individual main cells is lower than that of the flying cell (normally the case as the flying cell is in circuit only a portion of the total discharge time), the switching circuit connects the charger to the main cells. When the voltage of the individual main cells rises to equal that of the flying cell, the switching circuit connects the charger to the series combination of main cells and the flying cell.

As shown in FIG. 7, the main and fly cells 132, 134 are serially connected. The battery discharge circuit 104 is connected to the main cells 132 and a flying cell 134 in a parallel connection. The flying cell 134 could be a single or plurality of cells. First, second and third voltage divider circuits 135, 136, 138 include resistors 140 chosen for providing desired voltage drops. First and second voltage divider circuits 135, 136 are connected to a charge comparator 144 and the third voltage divider circuit 138 is connected to the discharge comparator 142. The first voltage divider circuit 135 connects to the non-inverting input and the second voltage divider circuit 136 connected to the inverting input of charge comparator. The third voltage divider circuit 138 is connected to the non-inverting input of the discharge comparator 142. The third voltage divider circuit 138 is operative with a reference 146, shown as a Zener diode in this one non-limiting example. The inverting input of the discharge comparator 142 is connected to a first terminal of a pole switch 150. The flying cell 134 and the first voltage divider circuit 134 is also connected. The output of the discharge and charge comparators 142, 144 are connected to the switch 150 as illustrated. The main cells 132 are connected to the other terminal of the switch 150, as are second and third voltage divider circuits 136, 138 and inverting input of op amp 142.

The discharge comparator 142 and charge comparator 144 compare the battery voltage when it falls to near the minimum cut-off voltage and allows the extra tier of cells as a flying cell to be switched in when the battery voltage falls to this near minimum cut-off voltage that could be established as desired by those skilled in the art. It is switched out when the battery voltage rises near the open circuit voltage. The voltage on the flying cell is sensed and compared to the individual voltages of the standard main cells 132. When the voltage of the individual main cells 132 is lower than that of the flying cell 134, the switching circuit 150 connects the charger to the main cells. When the voltage of the individual main cells 132 rises to equal that of the flying cell, the switching circuit 150 connects the charger to the series combination of main cells and the flying cell.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A self-heating battery, comprising:

a battery;

a heating element operatively connected to the battery and powered therefrom for heating the battery;

a temperature sensor circuit operatively connected to the heating element for detecting when the battery is below a temperature where available battery capacity is limited and turning on the heating element to raise the temperature sufficiently so that the battery delivers a substantial majority of its rated capacity;

a charge protection circuit operative with the battery and comprising an operational amplifier having an output and a transistor connected to said output of said operational amplifier and operative for sensing current through the transistor by measuring its voltage drop such that when the battery is in a quiescent state the operational amplifier senses no voltage across the transistor and biases the transistor off, wherein when a charge potential is applied to the battery the transistor is off ensuring that no charge current can flow and when a charge is applied, discharge current flows such that the operational amplifier senses the forward voltage drop and when the drop exceeds a predetermined amount, the operational amplifier turns the transistor on, clamping its forward voltage drop a predetermined amount such that charge protection has minimal effect on the battery terminal voltage; and a discharge current circuit operative with said heating element for locking out the heating element when the battery is not in use so as to prevent the heating element from discharging the battery when stored at cold temperatures and turning off the heating element when the discharge current is high to allow the entire available energy from the battery to be delivered to a load during periods of peak demand.

2. The self-heating battery according to claim 1, wherein said transistor connected to said output of said operational amplifier comprises a field effect transistor.

3. The self-heating battery according to claim 1, wherein said temperature sensor circuit comprises an operational amplifier having an output and a transistor connected at the output and connected to said heating element.

4. The self-heating battery according to claim 3, wherein said transistor within said temperature sensor circuit comprises a field effect transistor.

5. The self-heating battery according to claim 1, wherein said discharge current circuit includes a resistor for sensing a load such that when the load is not sensed and the battery is not in use.

6. The self-heating battery according to claim 1, wherein said charge protection circuit further comprises a load sensor.

7. The self-heating battery according to claim 6, wherein said load sensor comprises a resistor.

* * * * *